US008328685B2

United States Patent
Mayhew et al.

(10) Patent No.: US 8,328,685 B2
(45) Date of Patent: Dec. 11, 2012

(54) METHOD AND SYSTEM FOR REDUCING DELAY IN POWER DOWNSHIFTS FOR AN AUTOMATIC TRANSMISSION

(75) Inventors: William R. Mayhew, Ann Arbor, MI (US); Haytham A. Fayyad, Dexter, MI (US); Stephen R. Tokish, Brighton, MI (US)

(73) Assignee: GM Global Technology Operations LLC

( * ) Notice: Subject to any disclaimer, the term of this patent is extended or adjusted under 35 U.S.C. 154(b) by 638 days.

(21) Appl. No.: 12/567,208

(22) Filed: Sep. 25, 2009

(65) Prior Publication Data

US 2011/0077123 A1    Mar. 31, 2011

(51) Int. Cl.
  *B60W 10/00* (2006.01)
(52) U.S. Cl. ............ 477/70; 477/79; 477/86
(58) Field of Classification Search ......... 477/70, 477/79, 80, 86, 90, 91, 115, 120, 121, 128, 477/140, 156, 162, 166, 175, 176, 180
See application file for complete search history.

(56) References Cited

U.S. PATENT DOCUMENTS

| | | | | |
|---|---|---|---|---|
| 5,119,695 A | * | 6/1992 | Milunas et al. | 477/98 |
| 6,272,415 B1 | * | 8/2001 | Tanaka et al. | 701/54 |
| 6,319,172 B1 | | 11/2001 | Steinmetz et al. | |
| 6,887,183 B2 | * | 5/2005 | Murasugi | 477/143 |
| 7,010,406 B2 | * | 3/2006 | Sah et al. | 701/55 |
| 7,134,983 B2 | * | 11/2006 | Yu | 477/79 |
| 7,278,953 B2 | * | 10/2007 | Meyer et al. | 477/176 |
| 7,381,151 B2 | * | 6/2008 | Shim | 477/154 |
| 7,534,195 B2 | * | 5/2009 | Matsumura et al. | 477/78 |
| 2005/0216159 A1 | | 9/2005 | Whittton | |
| 2007/0010373 A1 | * | 1/2007 | Meyer et al. | 477/143 |

* cited by examiner

*Primary Examiner* — Justin Holmes

(57) ABSTRACT

A method and control module for controlling a transmission of a vehicle includes a clutch torque load predictor module generating a predicted clutch torque load signal for the shift command and a minimum clutch pressure module generating a minimum clutch pressure signal corresponding to a minimum clutch pressure. The control module includes a pressure command module generating a commanded clutch pressure signal for the predicted clutch torque load signal based on the minimum clutch pressure signal and commanding operation of a clutch with a commanded clutch pressure signal. The control module also includes a transmission control module generating the shift command after the clutch torque load predictor module generates the predicted clutch signal, the minimum clutch pressure module generates the minimum clutch pressure signal and the pressure command module generates the commanded clutch pressure signal.

16 Claims, 6 Drawing Sheets

| Range \ Clutch | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X |

METHOD AND SYSTEM FOR REDUCING DELAY IN POWER DOWNSHIFTS FOR AN AUTOMATIC TRANSMISSION

FIELD OF THE INVENTION

The present invention relates to transmission and engine control systems for automotive vehicles, and more particularly to clutch pressure control systems and methods.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In general, a motor vehicle automatic transmission includes a number of gear elements and selectively engageable friction elements (referred to herein as clutches) that are controlled to establish one of several forward speed ratios between the transmission input and output shafts. The input shaft is coupled to the vehicle engine through a fluid coupling such as a torque converter, and the output shaft is coupled to the vehicle drive wheels through a differential gearset.

Shifting from a currently established speed ratio to new speed ratio involves, in most cases, disengaging a clutch (off-going clutch) associated with the current speed ratio and engaging a clutch (on-coming clutch) associated with the new speed ratio. The shift is generally characterized as comprising three phases: a preparation phase, a torque phase, and an inertia phase.

In the preparation phase, the on-coming clutch is filled in preparation for torque transmission, and the off-going clutch pressure is progressively reduced in preparation for disengagement. In the torque phase, the on-coming clutch gains torque capacity, and the off-going clutch loses torque capacity at a rate that matches the rate of increase in torque capacity of the on-coming clutch, but without a corresponding change in the input speed. The input speed change occurs during the inertia phase, as the on-coming clutch pressure is controlled to decelerate the input shaft, and the off-going clutch is fully released. The off-going clutch is released during the preparation phase, before the on-coming clutch has achieved sufficient torque capacity; this allows the engine to momentarily accelerate the input shaft prior to the inertia phase of the shift, resulting in a loss of output torque which is perceived by the vehicle occupants as a momentary neutral sensation. The off-going clutch is released after the on-coming clutch has achieved sufficient torque capacity; this results in what is known as a tie-up interval during which the on-coming and off-going clutches are working in opposition, resulting in a sharp drop in output torque that is perceived by the vehicle occupants as a momentary braking sensation.

Since the relative timing of the on-coming engagement and the off-going disengagement is critical to achieving a high quality shift, it has been customary to use a uni-directional torque transmitting mechanism, such as a free-wheel clutch, to release the off-going clutch as the torque capacity of the on-coming clutch builds up during the torque phase of the shift, closely approximating the ideal timing. However, free-wheel clutches significantly increase the cost of a transmission, and various electronic control techniques have been developed for achieving clutch-to-clutch upshifts in which an electronic control module controls both the on-coming clutch apply and the off-going clutch release.

Power downshift delays have been shown to decrease customer satisfaction. Power downshift delays in transmissions are increasing due to high fuel economy requirements for early patterns and increasing numbers of gears in transmissions. Typically, there is a required delay for bringing the off-going clutch element from its holding state to a critical level to control the shift.

SUMMARY

The present disclosure is directed to an improved transmission upshift control in which the off-going clutch is controlled to be commanded at a level for the next expected power downshift.

In one aspect of the disclosure, a method includes generating a predicted clutch torque load signal for the shift command, generating a minimum pressure signal corresponding to a minimum clutch pressure, generating a commanded clutch pressure signal for the predicted clutch torque load signal based on the minimum clutch pressure signal and commanding operation of a clutch with a commanded clutch pressure signal. Thereafter the method includes generating the shift command.

In another aspect of the disclosure, a control module for controlling a transmission of a vehicle includes a clutch torque load predictor module generating a predicted clutch torque load signal for the shift command and a minimum clutch pressure module generating a minimum clutch pressure signal corresponding to a minimum clutch pressure. The control module includes a pressure command module generating a commanded clutch pressure signal for the predicted clutch torque load signal based on the minimum clutch pressure signal and commanding operation of a clutch with a commanded clutch pressure signal. The control module also includes a transmission control module generating the shift command after the clutch torque load predictor module generates the predicted clutch signal, the minimum clutch pressure module generates the minimum clutch pressure signal and the pressure command module generates the commanded clutch pressure signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description and the accompanying drawings, wherein.

DETAILED DESCRIPTION

Figures 1, 2:
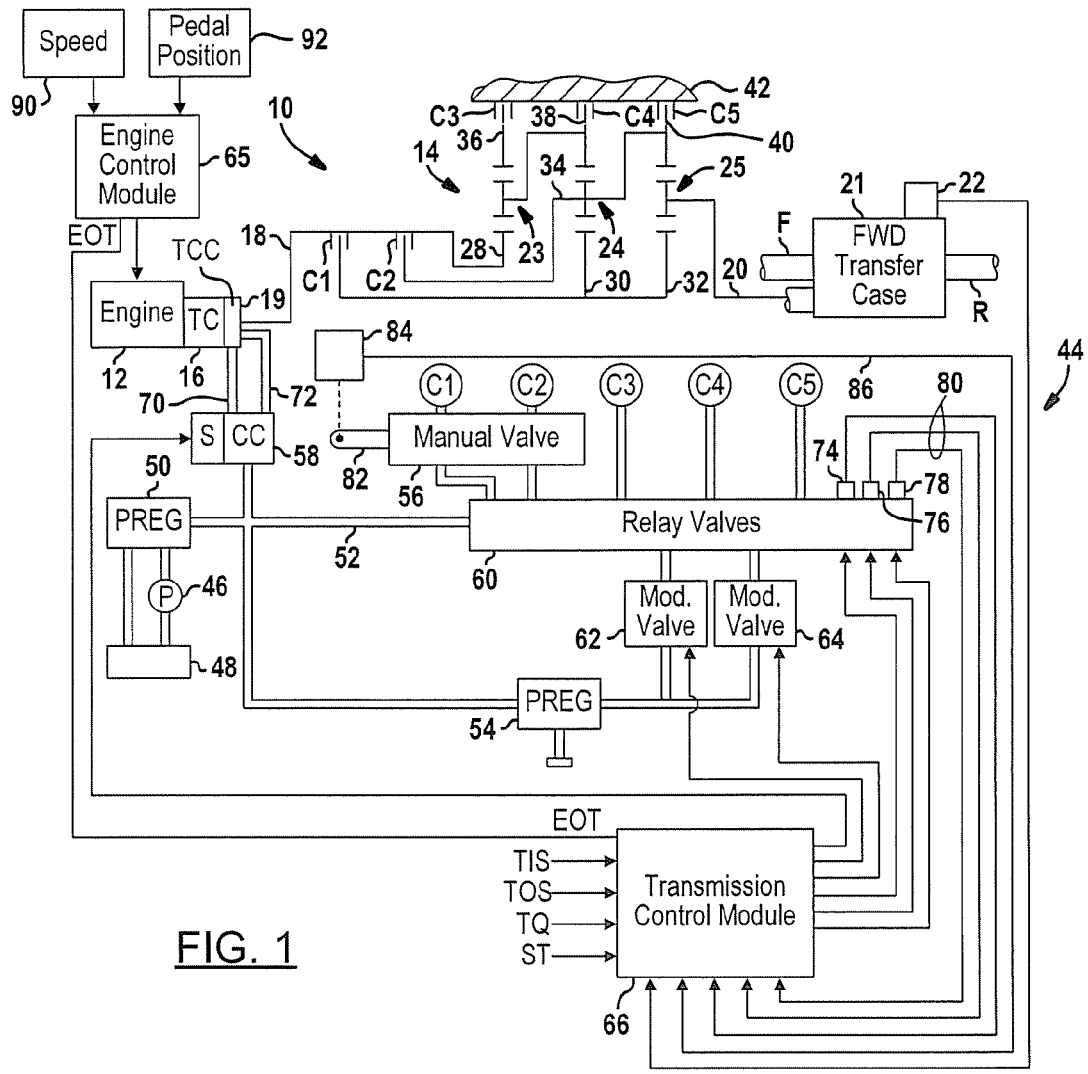
FIG. 1 is a functional block diagram of an engine control system according to the present disclosure.
FIG. 2 is a diagram indicating a relationship between a transmission clutch activation and a corresponding speed ratio.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4. Various numbers of clutches and gears may be used in a transmission.

The torque converter clutch 19 and the transmission clutches C1-C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58-64.

The electronic portion of the control is primarily embodied in the engine control module 65 and the transmission control module 66, illustrated in FIG. 1 as two separate elements. The engine control module 65 controls the operation of engine functions such as fuel, spark timing, etc. on depending on the control variables afforded by engine 12, and the transmission control module 66 controls the solenoid operated fluid control valves 58-64 based on a number of inputs to achieve a desired transmission speed ratio. The transmission control module inputs include signals representing the transmission input speed TIS, a driver torque command TQ, and the transmission output speed TOS. Sensors for developing such signals may be conventional in nature, and have been omitted for simplicity. Additionally, the engine control module 65 supplies an engine output torque signal EOT to transmission control module 66.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control module 66 on lines 80 based on the respective relay valve positions. The control module 66, in turn, monitors the various diagnostic signals for the purpose of electrically verifying proper operation of the controlled elements.

The solenoid operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1-C5 with only two modulated valves 62, 64. For any selected ratio, the control module 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control module 66 determines pressure commands for smoothly engaging the on-coming clutch while smoothly disengaging the off-going clutch, develops corresponding force motor current commands, and then supplies current to the respective force motors in accordance with the current commands.

The engine control module 65 may be in communication with various sensors for determining the operating conditions of the vehicle. For example, the engine control module 65 may include a speed sensor 90 used for generating a vehicle speed. The speed sensor 90 may be generated from various types of sensors including a sensor within the transmission control module 66 or from wheel speed sensors on the vehicle. A pedal position sensor 92 generates a pedal position signal corresponding to the accelerator pedal position. As will be described below, the pedal position signal 92 may be used to control the shifting within the transmission control module 66. The pedal sensor signal and the vehicle speed signal may be communicated to the transmission control module 66.

Figure 3:
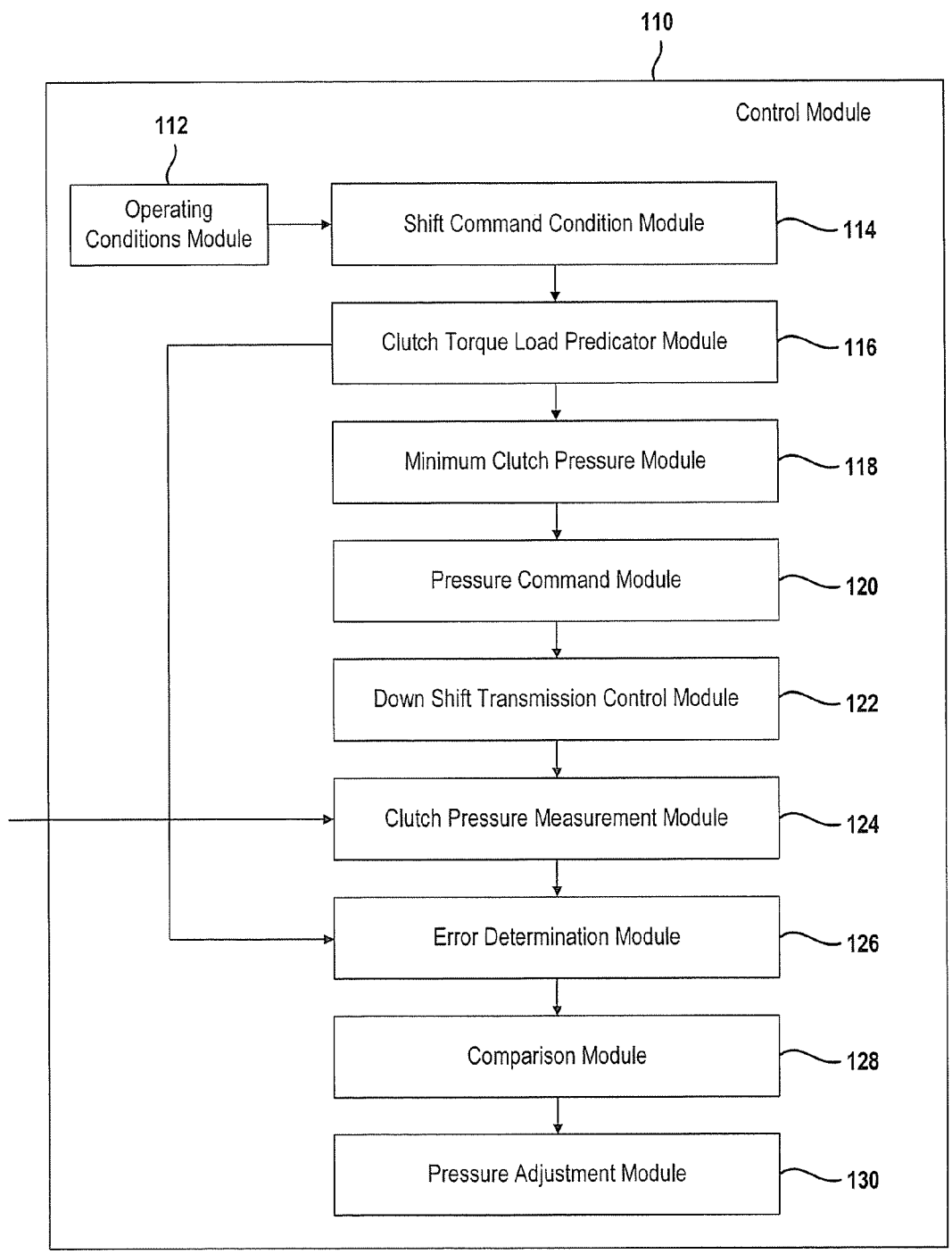
FIG. 3 is a block diagram of a control module corresponding to the transmission control module and engine control module of FIG. 1.

Referring now to FIG. 3, a control module 110 is illustrated. The control module 110 may have the various functions of the engine control module 65 and the transmission control module 66 described above in FIG. 1. This may be referred to as a powertrain control module. Although one control module is illustrated in FIG. 2, the functions may also be broken up into the different modules including, but not limited to, those illustrated in FIG. 1. The control module 110 includes an operating conditions module 112 that generates operating conditions for various vehicle functions. The operating conditions module 112 may, for example, be in communication with various sensors such as the vehicle speed sensor 90 and the pedal position sensor 92.

The control module 110 may also include a shift command condition module 114. The shift command condition module 114 receives the signals from the operating conditions module 14 and presumes a downshift will be commanded. The shift command condition module presumes that a downshift will be commanded for the current vehicle speed and calculates the conditions at a shift command.

A clutch torque load predictor module 116 predicts a torque load for the time of the shift command and generates a torque load signal. A torque load signal is communicated to the minimum clutch pressure module 118. The minimum clutch pressure module determines a minimum clutch pressure for the predicted clutch load determined in module 116. A pressure command module 120 generates a pressure command that corresponds to the minimum clutch pressure for the predicted clutch load. A downshift transmission control module 122 determines whether or not a downshift has been commanded by the transmission controller.

A clutch pressure measurement module 124 may receive the downshift signal from the downshift transmission control module 122. The clutch pressure measurement module measures the commanded clutch pressure at an observed clutch slip point. An error determination module 126 receives the measured pressure and the predicted pressure and determines an error. The measured load corresponding to the pressure from block 124 is used as well as the predicted clutch load from the clutch load predictor module 116.

The error determination module provides an error signal to the comparison module 128. The comparison module 128 compares the error determined in block 126 to a threshold. When the error is not in an acceptable range (being above or below a threshold depending on the design), a pressure adjustment module 130 adjusts the minimum pressure determined in the minimum pressure module 118.

Figure 4:
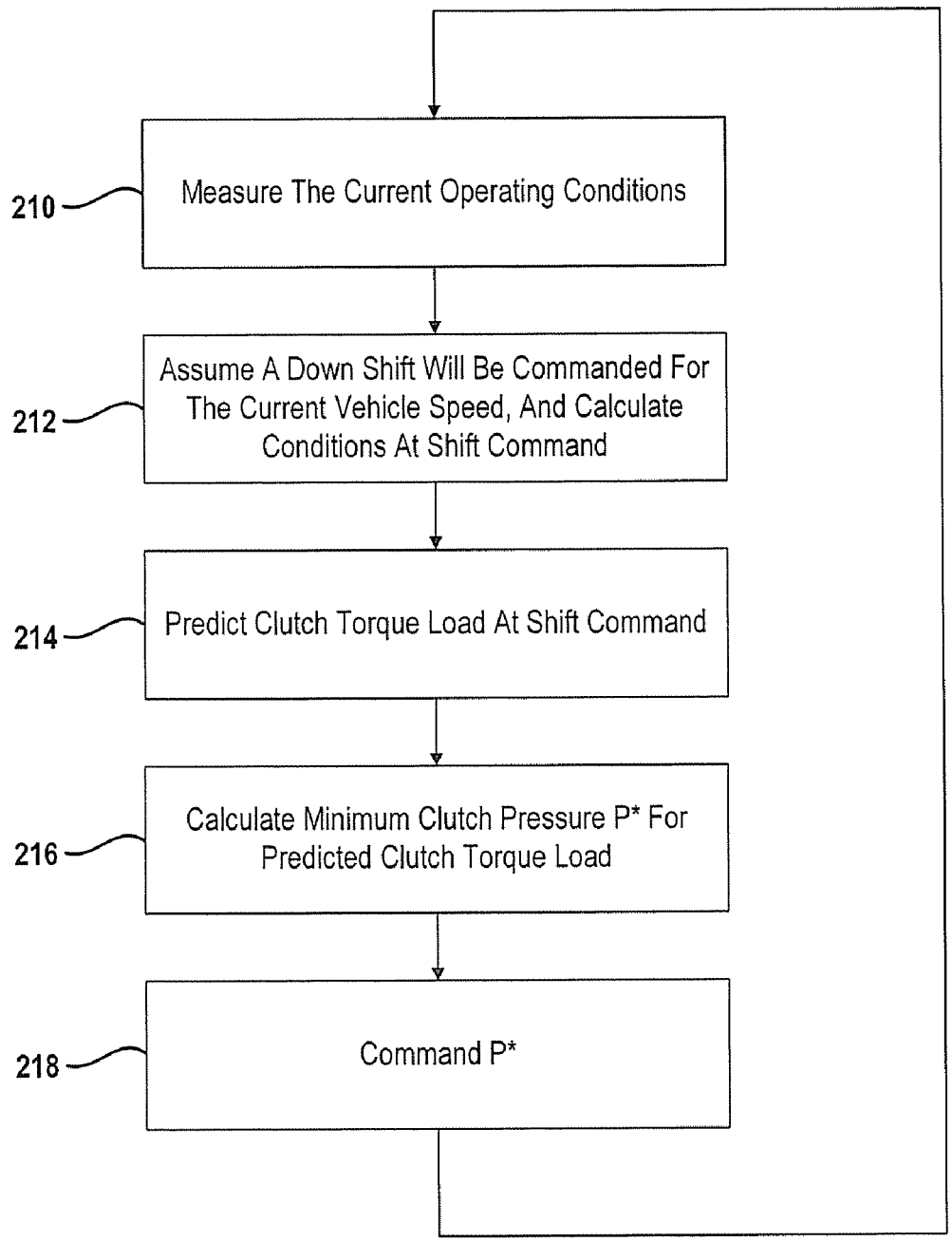
FIG. 4 is a flowchart of a feed-forward algorithm according to the present disclosure.

Referring now to FIG. 4, a flowchart of a method for operating the transmission for a vehicle is set forth. The flowchart is divided into a feed-forward algorithm and a feed-back algorithm. The feed-forward algorithm is set forth in FIG. 4, whereas the feed-back algorithm is set forth in FIG. 5. In step 210, the current operating conditions for the vehicle are determined. Examples of useful operating conditions are the speed of the vehicle and the pedal position of the acceleration pedal.

In step 212, an impending downshift is assumed for the current vehicle speed and conditions are calculated for the shift command. In step 214, a predicted clutch torque load at the shift command is determined. In step 216, the minimum clutch pressure for the predicted clutch torque load determined in step 214 is determined in step 216. In step 218, the minimum clutch pressure for the predicted clutch torque load is commanded to operate the off-going clutch. The system continually operates. Therefore, after step 218, step 210 is performed.

Figure 5:
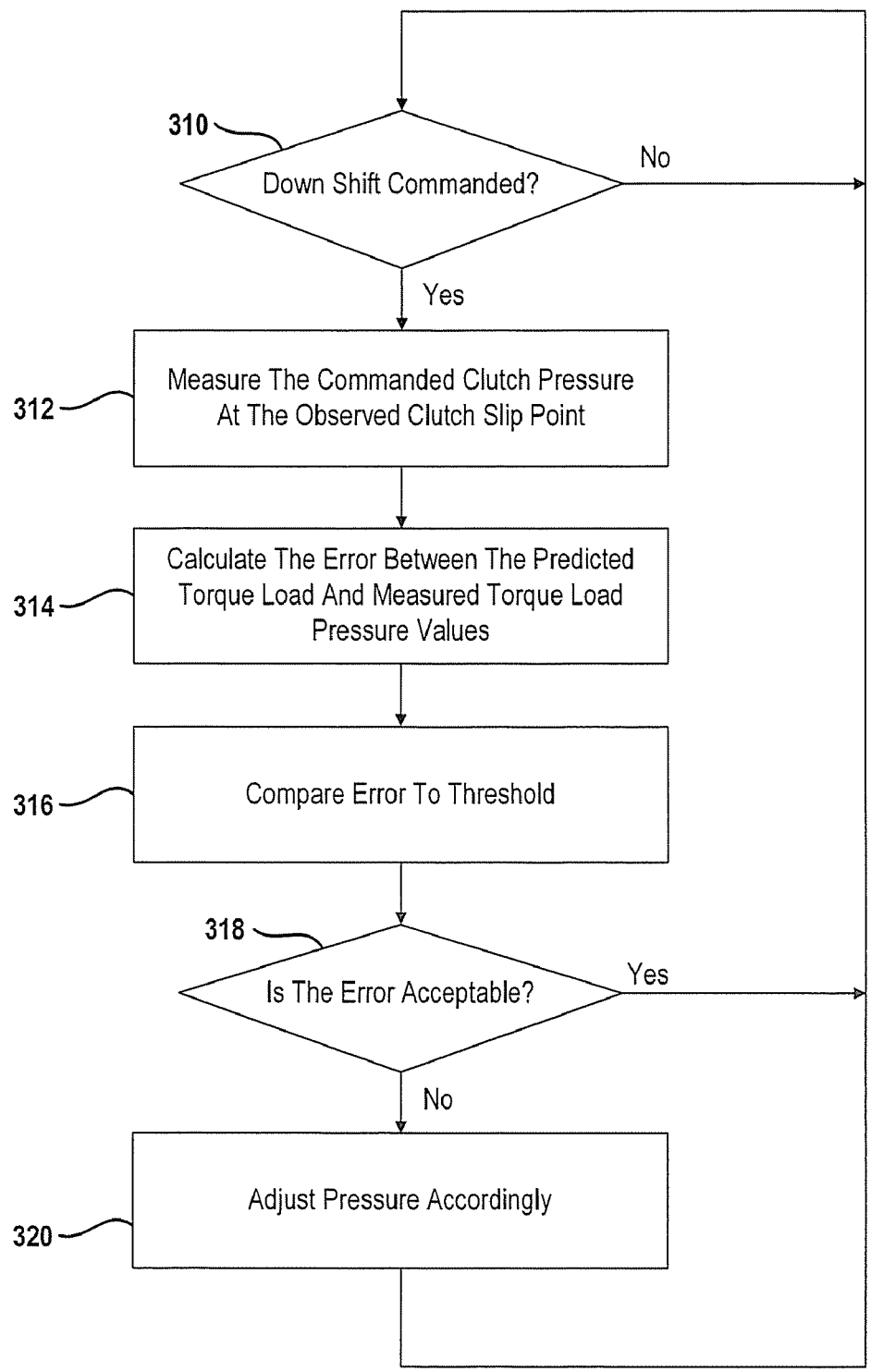
FIG. 5 is a flowchart of a feed-back algorithm for the present disclosure.

Referring now to FIG. 5, step 310 determines whether a downshift has been commanded. When a downshift has not been commanded, step 310 is performed again. In step 312, a commanded clutch pressure at the observe clutch point is measured. In step 314, an error between the predicted torque load and the measured torque load as derived from the pressure values is calculated. In step 316, the error generated in step 314 is compared to a threshold. In step 318, when the error is acceptable, step 310 is again performed. When the error is not acceptable, step 320 adjusts the minimum clutch pressure from step 216 up or down based upon the error. After step 320, step 310 is again performed.

Figure 6:
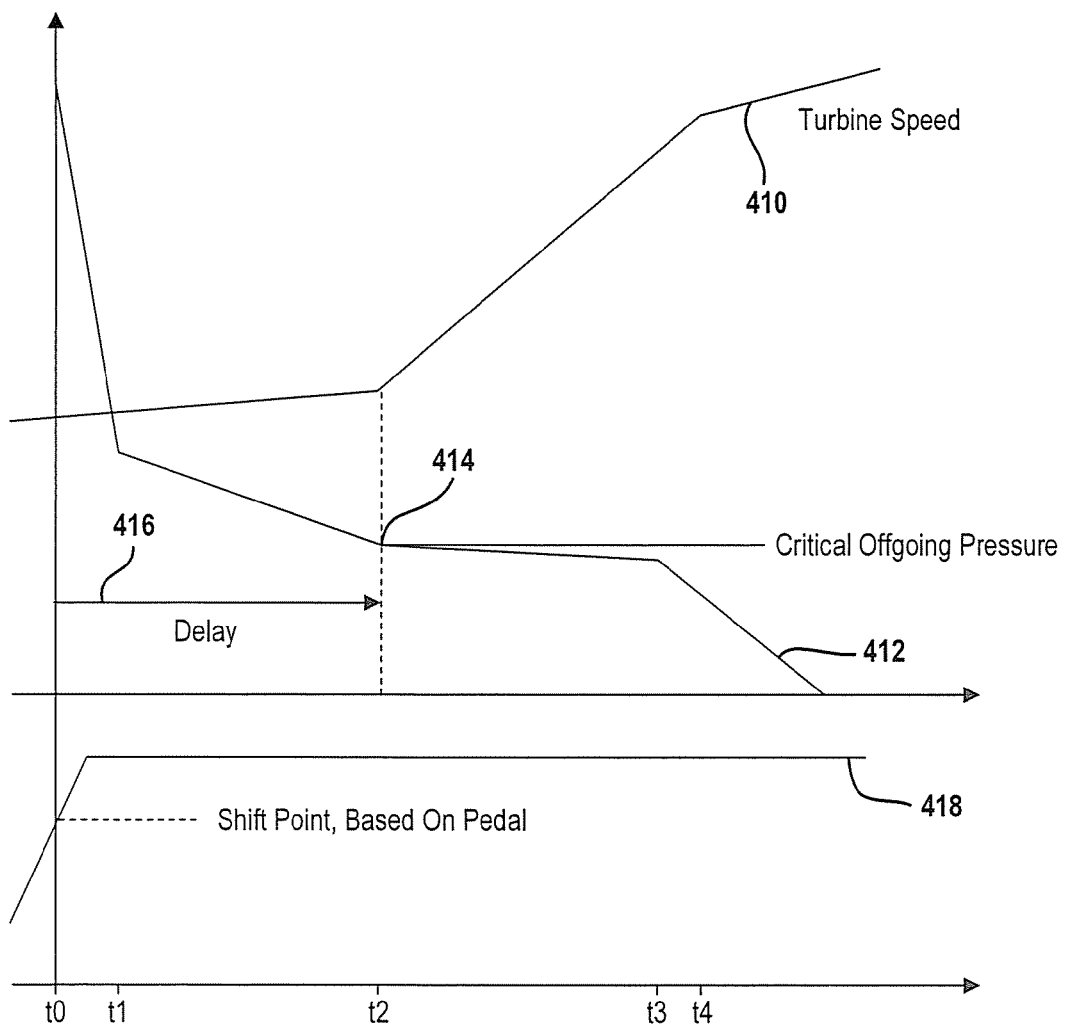
FIG. 6 is a plot of turbine speed and off-going pressure illustrating a delay due to off-going pressure control delays.

Referring now to FIG. 6, a plot of a turbine speed signal 410 and an off-going pressure signal 412 are illustrated. At time t2 a critical off-going pressure 414 is illustrated. A delay time 416 corresponding to time t2 is thus illustrated. In the lower portion of the plot, a pedal position signal 418 is illustrated. The shift point happens at t0 and thus the delay 416 corresponds to the time between the shift point and the critical off-going pressure 416 causing the transmission to downshift.

Figure 7:
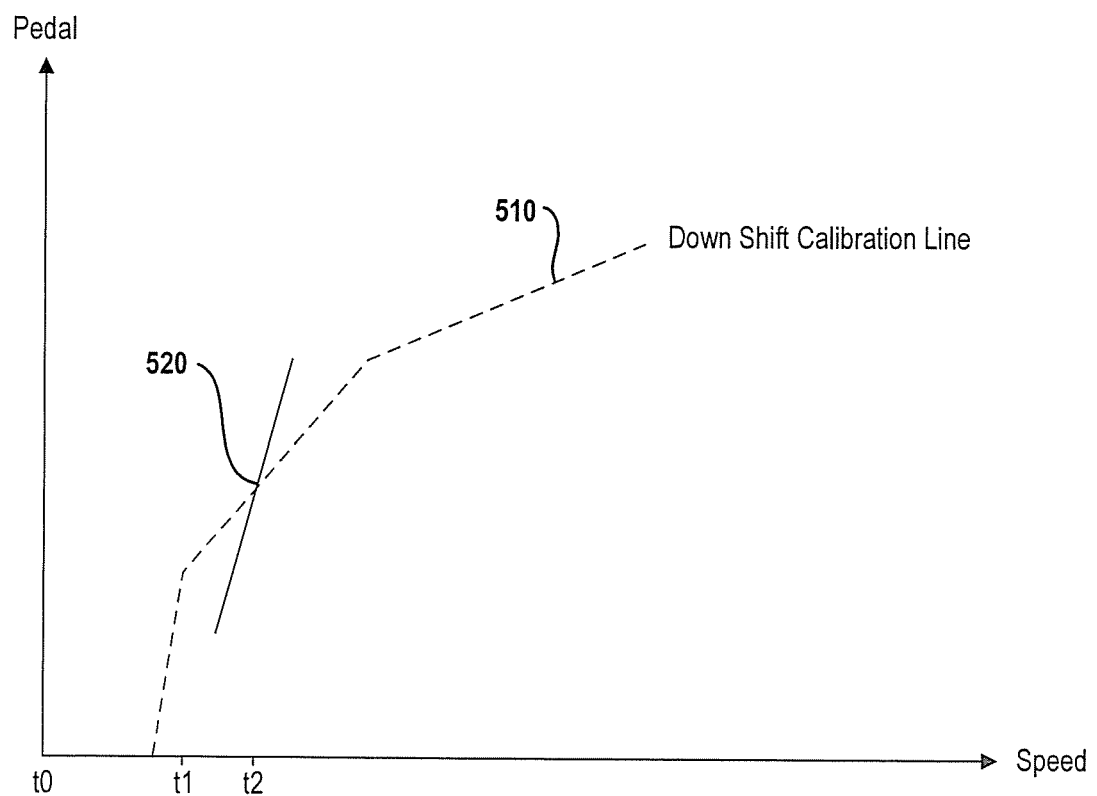
FIG. 7 is a plot of a downshift calibration line and an off-going pressure that is held to achieve a level of torque to minimize off-going pressure control delays.

Referring now to FIG. 7, when the off-going clutch is known, then the off-going pressure may be commanded lower in order to minimize or eliminate the delay. A downshift calibration line 510 is illustrated. In the upshifted gear, the critical off-going pressure is commanded to hold a level of torque corresponding to point 520.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method for controlling an automatic transmission of a vehicle comprising:
   prior to generation of a downshift command for downshifting the automatic transmission:
      generating a predicted torque load on an off-going clutch at the time of generation of the downshift command;
      determining a minimum pressure for the off-going clutch based on the predicted torque load;
      generating a commanded pressure for the off-going clutch based on the minimum pressure; and
      applying pressure to the off-going clutch at the commanded pressure;
   generating the downshift command for downshifting the automatic transmission; and
   downshifting the automatic transmission in response to the downshift command.

2. A method as recited in claim 1 further comprising determining the minimum pressure further based on an accelerator pedal position.

3. A method as recited in claim 1 further comprising determining the minimum pressure further based on a vehicle speed.

4. A method as recited in claim 1 further comprising determining the minimum pressure further based on a vehicle speed and an accelerator pedal position.

5. A method as recited in claim 1 further comprising, in response to the generation of the downshift command:

selectively determining a measured torque load on the off-going clutch;

determining an error based on the measured torque load and the predicted torque load;

determining whether to adjust the minimum pressure based on the error; and selectively adjusting the minimum pressure in response to a determination to adjust the minimum pressure.

6. A method as recited in claim 5 further comprising, in response to the generation of the downshift command, determining whether to adjust the minimum pressure based on a comparison of the error and a predetermined value.

7. A method as recited in claim 5 further comprising adjusting the minimum pressure based on the error.

8. A method as recited in claim 5 further comprising determining the measured torque load based on a pressure of the off-going clutch measured at a predetermined slip.

9. A control module for controlling an automatic transmission of a vehicle comprising:

a clutch torque load predictor module that, before generation of a downshift command for downshifting the automatic transmission, generates a predicted torque load on an off-going clutch at the time of generation of the downshift command;

a minimum clutch pressure module that, before the generation of the downshift command, determines a minimum pressure for the off-going clutch based on the predicted torque load;

a pressure command module that, before the generation of the downshift command:

generates a commanded pressure for the off-going clutch based on the minimum pressure; and applies pressure to the off-going clutch at the commanded pressure; and a transmission control module that generates the downshift command after: the clutch torque load predictor module generates the predicted torque load, the minimum clutch pressure module generates the minimum pressure, and the pressure command module generates the commanded pressure and applies the pressure to the off-going clutch.

10. A control module as recited in claim 9 wherein the minimum clutch pressure module determines the minimum pressure further based on an accelerator pedal position.

11. A control module as recited in claim 9 wherein the minimum clutch pressure module determines the minimum pressure further based on a vehicle speed.

12. A control module as recited in claim 9 wherein the minimum clutch pressure module generates the minimum pressure further based on a vehicle speed and an accelerator pedal position.

13. A control module as recited in claim 9 further comprising:

a clutch pressure measurement module that, after the generation of the downshift command, selectively determines a measured torque load on the off-going clutch;

an error determination module that, after the generation of the downshift command, determines an error based on the measured torque load and the predicted torque load;

a comparison module that, after the generation of the downshift command, determines whether to adjust the minimum pressure based on the error; and a pressure adjustment module that, after the generation of the downshift command, selectively adjusts the minimum pressure in response to a determination to adjust the minimum pressure.

14. A control module as recited in claim 13 wherein the comparison module determines whether to adjust the minimum pressure based on a comparison of the error and a predetermined value.

15. A control module as recited in claim 13 wherein the pressure adjustment module adjusts the minimum pressure based on the error.

16. A control module as recited in claim 13 further wherein the clutch pressure measurement module determines the measured torque load based on a pressure of the off-going clutch measured at a predetermined slip.

* * * * *